Patented Dec. 26, 1950

2,535,036

UNITED STATES PATENT OFFICE 2,535,036

MANUFACTURE OF FINELY DIVIDED SILICA

Donald B. Broughton, Boston, Mass., assignor to Godfrey L. Cabot, Inc., Boston, Mass., a corporation of Massachusetts No Drawing. Application September 3, 1946, Serial No. 694,680

1 Claim. (Cl. 23—182)

This invention comprises a new and improved process of making silica in finely divided form, or of so-called pigment grade, suitable for use as a reinforcing agent in compounding rubber or as a pigment. The process of my invention is characterized by the step of hydrolyzing silicon tetrafluoride vapor under specially advantageous conditions which will hereinafter be disclosed.

Silica of pigment grade or fineness has been made heretofore by burning organic compounds containing silicon, such as ethyl-ortho silicate, and then collecting the products of combustion, but these prior processes have not been entirely satisfactory from the standpoint of economy and in commercial practice have required careful technical supervision and control. Moreover, the product must be subjected to various troublesome separating or purifying steps in conditioning it for use. It has also been known that silicon tetrafluoride vapor might be hydrolyzed by bubbling it through a body of water but so far as known this has never been carried out on a commercial scale nor has the resulting product been suitable for use in compounding rubber.

The present invention is based on my discovery that by reacting silicon tetrafluoride in a dry state with steam, silica is produced in a totally unexpected and unpredictable degree of fineness, that is to say, as an impalpable amorphus white powder having a high specific surface area and having valuable characteristics as a reinforcing agent in natural and synthetic rubber compounds.

Silicon tetrafluoride for use in the process of my invention may be prepared from very inexpensive and readily available raw materials, namely, fluorite, sand and sulfuric acid. Fluorite, also called fluorspar, is found in massive and granular forms and is mined in Illinois and Kentucky as well as in Europe. Fluorite and sand react in a concentrated sulfuric acid solution according to the known reaction:

$$2CaF_2 + SiO_2 + 2H_2SO_4 \rightarrow SiF_4 + 2CaSO_4 + 2H_2O$$

When these materials are mixed and heated in a sulfuric acid solution of a concentration of about 70%, the tetrafluoride ($SiF_4$) vapor comes off and is directly available for hydrolysis in accordance with the present process. Hydrolysis of tetrafluoride in the liquid phase proceeds according to the following reaction:

$$3SiF_4 + 2H_2O \rightarrow SiO_2 + 2H_2SiF_6$$

If hydrolysis is carried out in the vapor phase the reaction is as follows:

$$SiF_4 + 2H_2O \rightarrow SiO_2 + 4HF$$

The process of my invention may be carried out in a dry state by mixing silicon tetrafluoride vapor with stream, all at a temperature above that at which condensation can take place. For example, steam may be introduced into a flowing current of $SiF_4$ and directed with it into a bag filter. The reaction begins immediately when contact is made and is evidenced by a white mist that becomes visible in the gas current. The whole apparatus is kept above the temperature of condensation until the bag filter is substantially filled with finely divided amorphus silica. The silica may then be removed from the bag as an impalpable white powder having an initial apparent density of approximately 4 lbs. per cubic foot and a specific surface area as high as 100–200 square meters per gram, and the step may be repeated or duplicated as desired.

Hydrolysis in the vapor phase has the advantage over hydrolysis in the liquid phase that the silicon tetrafluoride is converted completely to silica and that no recovery is required to get complete utilization of the silicon in the silicon tetrafluoride.

In liquid phase hydrolysis a gel is first formed which must be rendered anhydrous by heating and the final product is crystalline, whereas the product formed by hydrolysis in the vapor phase is obtained directly as anhydrous silica without ever passing through the hydrous stage. This latter process results in a product having properties different from and superior to finely divided silica hitherto available.

In the process of my invention, hydrofluoric acid is a by-product which can readily be put to use. It can be passed through sand to produce fluosilicic acid. Thereafter the fluosilicic acid is collected and treated with sulphuric acid to make silicon tetrafluoride which is in turn hydrolyzed by the process of my invention to produce silica of rubber pigment quality.

In another aspect, therefore, my invention comprises a process in which pigment grade silica is prepared from the end products of hydrolysis of tetrafluoride vapor, that is to say, from fluosilicic acid broken down into tetrafluoride combined with more tetrafluoride formed by passing hydrofluoric acid through sand together with the tetrafluoride already available.

Having thus disclosed my invention and described in detail an illustrative manner in which it may be carried out I claim as new and desire to secure by Letters Patent:

The process of producing an amorphous and finely divided silica which comprises reacting SiF₄ and H₂O in vapor phase and at a temperature which prevents the formation of moisture, collecting said silica after its formation separate from the reaction and maintaining said collected silica at a sufficiently high temperature to prevent the formation of moisture therein, maintaining said temperature until the HF has substantially separated therefrom, and then lowering the temperature of the collected silica.

DONALD B. BROUGHTON.

REFERENCES CITED

The following references are of record in the file of this patent:

UNITED STATES PATENTS

| Number | Name | Date |
|---|---|---|
| 2,428,178 | Reik | Sept. 30, 1947 |

OTHER REFERENCES

Guntz, Ann. Chim. Phys., vol. 69 (1), p. 204 (1809).

"Dictionary of Applied Chemistry," by Thorpe, vol. 4 (1916), p. 674.

"Inorganic and Theoretical Chemistry" by Mellor, vol. 6, Longmans, Green and Co., N. Y. (1925), pp. 935, 937, 942 and 943.